United States Patent
Rhodes et al.

(10) Patent No.: US 9,740,995 B2
(45) Date of Patent: Aug. 22, 2017

(54) COORDINATE-BASED DOCUMENT PROCESSING AND DATA ENTRY SYSTEM AND METHOD

(71) Applicant: Rocaton Investment Advisors, LLC, Norwalk, CT (US)

(72) Inventors: James J. Rhodes, Carmel, NY (US); D. Adam Wheat, Newtown, CT (US)

(73) Assignee: Morningstar, Inc., Chicago, IL (US)

( * ) Notice: Subject to any disclaimer, the term of this patent is extended or adjusted under 35 U.S.C. 154(b) by 96 days.

(21) Appl. No.: 14/064,606

(22) Filed: Oct. 28, 2013

(65) Prior Publication Data
US 2015/0117721 A1    Apr. 30, 2015

(51) Int. Cl.
*G06K 9/00* (2006.01)
*G06Q 10/06* (2012.01)
*G06Q 10/10* (2012.01)

(52) U.S. Cl.
CPC ............ *G06Q 10/06* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 4,625,288 A | * | 11/1986 | Weiner | G06F 3/04845 345/621 |
| 5,642,435 A | * | 6/1997 | Loris | G06K 9/2054 382/224 |
| 6,597,808 B1 | * | 7/2003 | Guo | G06K 9/2054 382/173 |
| 6,930,803 B1 | * | 8/2005 | Suzuki | G06T 1/0021 358/426.04 |
| 8,352,855 B2 | | 1/2013 | Levy et al. | |

(Continued)

FOREIGN PATENT DOCUMENTS

| | | |
|---|---|---|
| EP | 2309398 | 4/2011 |
| WO | WO2005/010727 | 2/2005 |
| WO | WO2011/019370 | 2/2011 |

OTHER PUBLICATIONS

PDF-TREX: An Approach for Recognizing and Extracting Tables from PDF Documents, Ermelinda Oro and Massimo Ruffolo, Jul. 2009, 5 pages.

(Continued)

*Primary Examiner* — Iman K Kholdebarin
(74) *Attorney, Agent, or Firm* — Goodwin Procter LLP

(57) ABSTRACT

Embodiments of the presently disclosed invention are directed to a document processing system and method that facilitates the processing and extraction of data from the documents. The system and method receive at least one document, where the document may contain data for extraction. The document may then be converted into a preferred document format and outputted to a user interface. The system and method may then receive a selection of at least a portion of the document, wherein the selection contains data for extraction. Based on the selection, at least one coordinate set corresponding to the selection and associated with at least one data field of interest is generated. Then the data from the selection of the document is extracted using the at least one coordinate set. Finally, a structured data set that includes the extracted data is generating, and storing in a computer memory.

20 Claims, 13 Drawing Sheets

(56) References Cited

U.S. PATENT DOCUMENTS

| | | | |
|---|---|---|---|
| 8,477,992 B2* | 7/2013 | Paul | G06K 9/00577 382/101 |
| 8,724,907 B1* | 5/2014 | Sampson | G06K 9/6255 382/209 |
| 8,880,540 B1* | 11/2014 | Sampson | G06K 9/00463 707/756 |
| 9,111,186 B2* | 8/2015 | Blasinski | G06K 19/0614 |
| 2002/0114522 A1* | 8/2002 | Seeber | G06F 17/30256 382/218 |
| 2003/0009315 A1* | 1/2003 | Thomas | G06F 17/50 703/1 |
| 2004/0119727 A1* | 6/2004 | Dietz | G06F 3/0481 345/629 |
| 2004/0153649 A1* | 8/2004 | Rhoads | G06F 17/241 713/176 |
| 2004/0223197 A1* | 11/2004 | Ohta | G06F 17/30271 358/538 |
| 2004/0247206 A1* | 12/2004 | Kaneda | G06F 17/30271 382/305 |
| 2005/0001419 A1* | 1/2005 | Levy | B41M 5/24 281/2 |
| 2005/0021970 A1* | 1/2005 | Reese | G06T 1/0071 713/176 |
| 2005/0105726 A1* | 5/2005 | Neubauer | G06T 1/005 380/201 |
| 2005/0149538 A1* | 7/2005 | Singh | G06F 17/30893 |
| 2006/0010148 A1* | 1/2006 | Sattler | G06F 17/2247 |
| 2006/0101058 A1* | 5/2006 | Chidlovskii | G06F 17/2247 |
| 2006/0157559 A1* | 7/2006 | Levy | G06K 17/00 235/380 |
| 2006/0184473 A1* | 8/2006 | Eder | G06N 5/022 706/20 |
| 2006/0288268 A1* | 12/2006 | Srinivasan | G06F 17/245 715/210 |
| 2007/0058206 A1* | 3/2007 | Barnes | G03G 21/043 358/3.28 |
| 2007/0118391 A1* | 5/2007 | Malaney | G06Q 10/00 382/229 |
| 2007/0140571 A1* | 6/2007 | Fan | G06K 9/00456 382/232 |
| 2007/0196015 A1* | 8/2007 | Meunier | G06F 17/2745 382/190 |
| 2007/0285723 A1* | 12/2007 | Fabel | G06Q 20/04 358/1.18 |
| 2008/0114757 A1* | 5/2008 | Dejean | G06K 9/00469 |
| 2008/0149713 A1* | 6/2008 | Brundage | G06T 1/0071 235/435 |
| 2008/0270463 A1* | 10/2008 | Wang | G06F 17/211 |
| 2009/0046856 A1* | 2/2009 | Mitchell | G09C 5/00 380/243 |
| 2009/0148039 A1* | 6/2009 | Chen | H04N 1/40062 382/165 |
| 2009/0282009 A1* | 11/2009 | Levey | G06F 17/30011 |
| 2009/0297024 A1* | 12/2009 | Dai | G06K 9/00456 382/165 |
| 2010/0174984 A1* | 7/2010 | Kobashi | G06F 17/24 715/243 |
| 2011/0007934 A1* | 1/2011 | Springmann | B41M 3/10 382/100 |
| 2011/0064283 A1* | 3/2011 | Hodson | G06F 19/3418 382/128 |
| 2011/0150336 A1* | 6/2011 | Van | G06K 9/00469 382/182 |
| 2012/0039534 A1* | 2/2012 | Malik | H03M 7/3064 382/173 |
| 2012/0042288 A1* | 2/2012 | Liao | H04N 1/00129 715/863 |
| 2013/0013612 A1 | 1/2013 | Fittges et al. | |
| 2013/0031150 A1* | 1/2013 | Kamath | G06F 17/2264 707/827 |
| 2013/0176583 A1* | 7/2013 | Tsutsumi | G06F 21/10 358/1.13 |
| 2013/0262968 A1* | 10/2013 | Gartman | G06F 17/2705 715/202 |
| 2013/0318110 A1* | 11/2013 | Develyn | G06K 9/00449 707/755 |
| 2014/0019492 A1* | 1/2014 | Woods | G06Q 10/10 707/806 |
| 2014/0068408 A1* | 3/2014 | Le Chevalier | G06F 17/2229 715/234 |
| 2014/0122479 A1* | 5/2014 | Panferov | G06F 3/0643 707/736 |
| 2014/0233837 A1* | 8/2014 | Sandoz | G06F 17/3028 382/138 |
| 2014/0325435 A1* | 10/2014 | Jung | G06F 3/04845 715/790 |
| 2014/0337719 A1* | 11/2014 | Xu | G06F 17/212 715/255 |
| 2015/0110401 A1* | 4/2015 | Tanaka | G06K 9/00442 382/182 |
| 2015/0120516 A1* | 4/2015 | Smith | G06Q 40/12 705/30 |
| 2015/0139531 A1* | 5/2015 | Hirai | H01L 22/12 382/149 |

OTHER PUBLICATIONS

XONTO: An Ontology-based System for Semantic Information Extraction from PDF Documents, Ermelinda Oro and Massimo Ruffolo, Nov. 2008, 8 pages.

Layout and Content Extraction for Pdf Documents, Hui Chao, Jian Fan, Lecture Notes in Computer Science, vol. 3163, p. 213-214, 2004.

* cited by examiner

410 — Reset | No Data | Too Complicated | ← | Document 1 | →

Zenith 401(k) Plan
Schedule H, Line 4i - Schedule of Assets (Held at the End of Year)
As of December 31, 2011
Employer Identification Number (EIN): 91-123456789
Plan Number (PN): 001
(See Report of Indepdendent Auditors)

420

| (a) | (b) Identity of Issue, Borrower... | (c) Description of Investment | (d) Values |
|---|---|---|---|
|  | W D Stable Value Fund | Collective Trust | 29,084,488 |
|  | America Funds R6 | Mutual Fund | 12,154,140 |
|  | Federal Government Fund | Mutual Fund | 11,458,370 |
|  | State Bank 500 Series | Money Market Fund | 9,579,131 |
|  | DS R4 | Mutual Fund | 6,635,708 |
|  | T Row Value | Mutual Fund | 6,548,389 |
|  | John Stanley Mkts I | Mutual Fund | 6,212,744 |
|  | Vandy Partners 500 | Mutual Fund | 4,212,555 |

Funds may constitute party-in-interest transactions
Note: Cost information has not been included above since all investments are participant directed Information certified as complete and accurate by Main Street Bank.

430 —
- Select Market Values
- Select Manager Name
- Select Investment Name
- Select Investment Type

| Reset | No Data | Too Complicated | ← | Document 1 | → |

Zenith 401(k) Plan
Schedule H, Line 4i - Schedule of Assets (Held at the End of Year)
As of December 31, 2011
Employer Identification Number (EIN): 91-123456789
Plan Number (PN): 001
(See Report of Indepdendent Auditors)

Select Market Values

Select Manager Name

Select Investment Name

Select Investment Type

| (a) | (b) Identity of Issue, Borrower... | (c) Description of Investment | (d) Values |
|---|---|---|---|
| | W D Stable Value Fund | Collective Trust | 29,084,488 |
| | America Funds R6 | Mutual Fund | 12,154,140 |
| | Federal Government Fund | Mutual Fund | 11,458,370 |
| | State Bank 500 Series | Money Market Fund | 9,579,131 |
| | DS R4 | Mutual Fund | 6,635,708 |
| | T Row Value | Mutual Fund | 6,548,389 |
| | John Stanley Mkts I | Mutual Fund | 6,212,744 |
| | Vandy Partners 500 | Mutual Fund | 4,212,555 |

510  520  530

Funds may constitute party-in-interest transactions
Note: Cost information has not been included above since all investments are participant directed Information certified as complete and accurate by Main Street Bank.

Collective Trust
Mutual Fund
Mutual Fund
Money Market Fund
Mutual Fund
Mutual Fund
Mutual Fund
Mutual Fund

COORDINATE-BASED DOCUMENT PROCESSING AND DATA ENTRY SYSTEM AND METHOD

FIELD OF THE INVENTION

Embodiments of the present invention relate generally to a document processing system and, more particularly, to an automated coordinate-based document processing and data extraction system and method.

BACKGROUND OF THE INVENTION

The amount of data stored, processed, and utilized across business industries is increasing at an exponential rate. Along with the increase in volume, the data that is embedded in business documents is growing in complexity at an equally significant rate. Yet, business-processing programs utilized today are unable to keep pace with the business demands of many companies to detect, properly extract and process the data from documents in an efficient, accurate, and cost-effective manner.

While a completely digital business environment has been realized for many companies in particular industries—where, for example, emails and digital copies of documents, forms, and other files are completely relied upon in daily operations—this is simply not possible for many companies, especially those operating in the financial, legal and medical industries. Indeed, due to business guidelines, regulatory requirements, or simply due to a hesitancy to stray from the familiar business practices, most companies rely on both digital and physical documents. For example, in the financial industry, many financial disclosure documents must be filed in physical form. But these documents must also be converted into digital form. Doing so allows companies to analyze data contained in these documents efficiently and with lower costs. However, particularly with documents containing complex and voluminous data sets, performing the detection and extraction of important data from physical or scanned documents has become a complicated and time-consuming process.

Currently available software solutions fail to effectively and efficiently process these complex documents. Within large documents containing unstructured data, the information and data fields that are of interest are often inconsistently referenced or scattered throughout the document, making it virtually impossible to automate the data extraction process. Traditional methods rely on time tested data entry techniques where an individual is responsible for transcribing data from a source document into a desired electronic format. However, this method is inaccurate. For instance, even if a proficient data entry specialist enters the data, the results may still be prone to human error from time-to-time. There is simply no adequate solution available. Indeed, there is currently no available system that allows users to quickly and accurately enter data from large, unstructured datasets.

Accordingly, there is an important need for an improved method and system for processing documents and files to detect and extract relevant embedded data according to business rules and needs. The solution should overcome the aforementioned deficiencies and others.

SUMMARY OF THE INVENTION

The presently disclosed invention satisfies the above-described needs for an improved system and method for automated document processing and data extraction. Embodiments of the present invention process documents containing structured, unstructured, and semi-structured data to extract embedded data using coordinate data. In particular, engines of the system rely upon coordinate data that define the locations and boundaries of relevant data for extraction. Each of the defined portions, which, for example, may be a rectangle or other user-defined shape, corresponds to a data field of interest. Based upon the coordinate data, relevant data is extracted and structured data sets are generated therefrom.

Various embodiments of the present invention take into account that the documents may be in any number of formats or forms. In such cases, the documents may be converted to a fixed-layout flat document format, and analyzed using Optical Character Recognition (OCR) software. In addition, the dimensions of the fixed-layout flat document may also be normalized for orientation, scale, and other standardization requirements. Furthermore, page resolution and image size(s) may be adjusted for easier readability by users.

In an aspect of the invention, a computer-implemented method for document processing and data extraction using coordinate selection set data is disclosed. In this method, at least one document containing data for extraction is received and converted into a document format supporting the extraction of coordinate data using at least one processor. The document is outputted, whereupon, a selection(s) is received. The selection(s), for example, may define the locations of the data for extraction. Subsequently, at least one coordinate set corresponding to the selection is generated, from which data from the document is then extracted. Finally, a structured data set is generated and stored in memory based on the extracted data.

In another aspect of the present invention, a system for document processing and data extraction using coordinate selection data is disclosed to include non-transitory memory and at least one computer processor that accesses the non-transitory memory and executes instructions to perform various operations, including receiving the document containing data for extraction and outputting the document. Furthermore, the at least one processor receives a selection of at least a portion of the data for extraction, from which at least one coordinate set is generated. The at least one processor can further extract data from the document using the at least one coordinate set and generate a structured data set. The extracted data may then be stored in the non-transitory memory.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 4 is a user interface displayed to a user in accordance with an embodiment of the invention.

FIGS. 5*a* and 5*b* are yet additional exemplary user interfaces displayed to a user in accordance with an embodiment of the invention.

DETAILED DESCRIPTION OF THE INVENTION

Embodiments of the presently disclosed invention are directed to a coordinate-based document processing system and method that facilitates the processing and extraction of data embedded in documents. The disclosed invention maximizes the accuracy, effectiveness and efficiency of document processing and data extraction processes using a novel coordinate-based data extraction and processing system and method.

It should be readily apparent to one of ordinary skill in the art that the presently disclosed invention may be implemented in a wide range of industries including any business and institution that would benefit from the document processing and data extraction systems and methods disclosed herein, including, but not limited to financial services businesses. The inventive methods and systems apply generally, without regard to the specific choice of the delivery of the graphical user interface.

Figure 1:
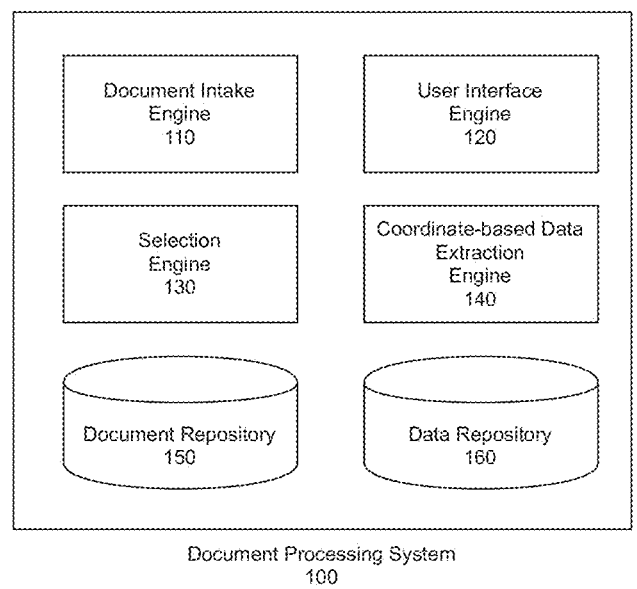
FIG. 1 is a block diagram illustrating a document processing and data extraction system in accordance with an embodiment of the invention.

FIG. 1 depicts a document processing system 100 in accordance with an embodiment of the present invention. The system 100 comprises a document intake engine 110, a user interface engine 120, a selection engine 130, a coordinate-based data extraction engine 140, a document repository 150, and a data repository 160. The engines and components of the document processing system 100 are capable of performing numerous novel operations, some of which will be described using the flowchart depicted in FIG. 2, which depicts a method for document processing and data extraction in accordance with an embodiment of the present invention.

The document intake engine 110 processes and prepares documents received at the document processing system 100 for data extraction. Documents may be received at the document processing system 100 in various forms and formats (in physical form, for instance) and the document intake engine 110 will facilitate the scanning of physical pages into digital form, if needed, and automatically convert the document into one or more preferred formats, such as Portable Document Format (PDF), Tagged Image File Format (TIFF), and others discussed herein or well known in the art. In one embodiment, the document intake engine 110 will cause the user interface engine 120 to generate a series of user interfaces that walks a user through the scanning of the physical documents into a supported format, such as PDF, TIFF or others. For instance, the document intake engine 110 may control one or more scanning devices well known in the art to cause or facilitate the scanning of the documents and to retrieve or generate the digital documents for use at the document processing system 100. The scanning that is conducted may be conducted in an automated fashion, semi-automated fashion, or in a completely manual fashion. Thus, the document intake engine 110 may cause the scanning of numerous pages and documents in a completely automated manner (e.g., by loading, scanning, and generating digital files for all of the documents without user assistance) or facilitate a user to manually scan individual or sets of individual pages (e.g., by instructing the user to feed pages into a scanner), or various manners between these two spectrums of operations. Indeed, the document intake engine 110 may be configured to facilitate the scanning of documents in any number of manners well known in the art.

Figure 2:
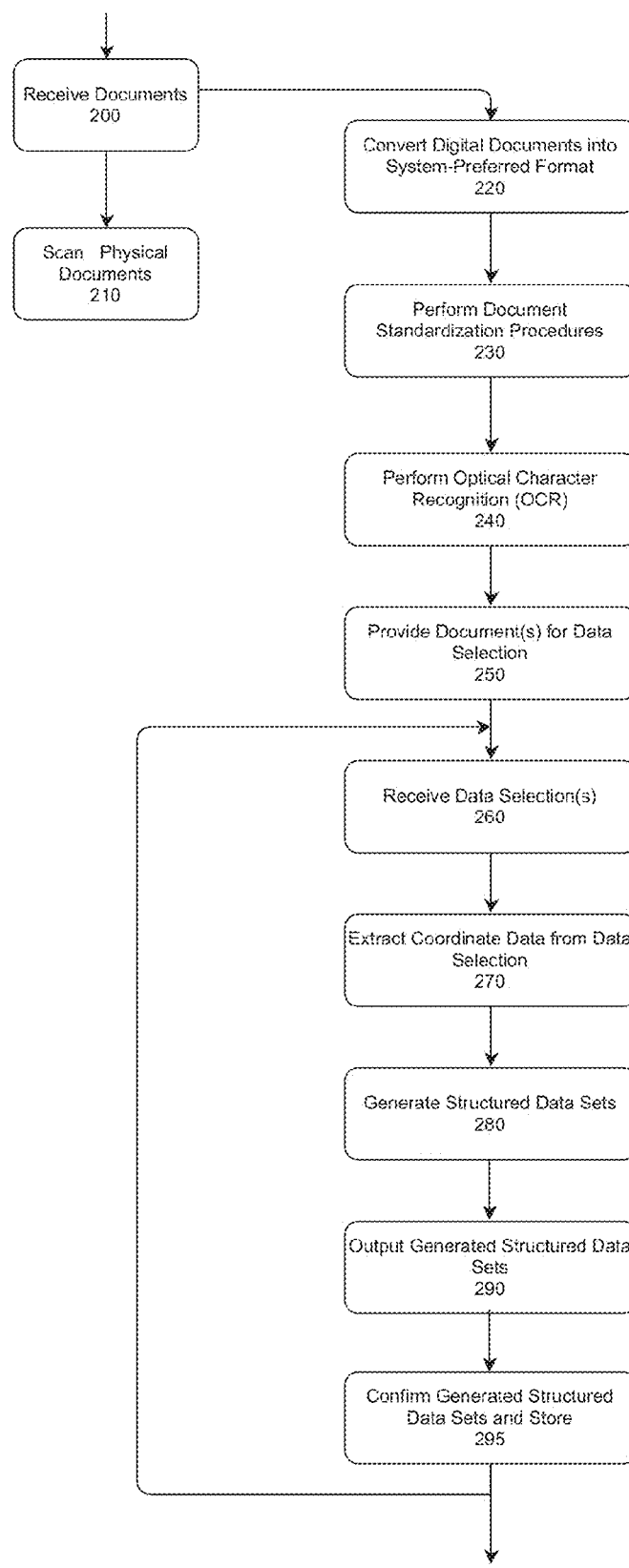
FIG. 2 is a flow chart illustrating an exemplary method for processing documents and extracting data using coordinate data in accordance with an embodiment of the invention.

In the method depicted in FIG. 2, the method may begin with the receiving of documents at step 200, and will proceed to the scanning of the documents at step 210.

Documents that are received at the document processing system may also be received in digital form. These received files may be in various formats, such as Microsoft Word format (DOC, DOCX, DOT), Adobe Portable Document Format (PDF), Tagged Image File Format (TIFF), Text file format (TXT), and others well known in the art, and described herein. In accordance with a preferred embodiment of the present invention, the document processing system 100 operates according to one or more preferred formats from which the coordinate-based data extraction process may be conducted. In one embodiment, the system supports a fixed-layout flat document format, such as PDF, though other file formats may be utilized in other embodiments such as TIFF, including formats that may be developed in the future. The system may also support non-fixed and semi-fixed document formats. In various embodiments, the system may operate according to a plurality of preferred formats. The preferred format(s) that is utilized at at least one embodiment of the system may be selected by the user, such as an administrator, though in these and other embodiments, the system may also support a default preferred format.

The document intake engine 110, at step 220, will convert the received documents into the preferred system format, such as Portable Document Format (PDF). This may also include converting a document in a different version of a format into the system-preferred version of the format. The scanned and/or converted documents are stored in the document repository 150, along with associated metadata. The original digital or scanned documents may also be stored in the document repository 150. Physical versions of the files may be stored in physical archives and referenced by one or more databases contained in the document repository 150 using one or more reference schemes that may be well known in the art.

In one embodiment, the document intake engine 110 will process each page of the preferred formatted documents according to one or more document standardization processes, at step 230, each of which may be configurable by a user of the system. Examples of such document standardization include, but are not limited, standardization of the documents according to size, orientation, font, text size, color, element positioning, page numbering, margins, column size or shape, watermarking, line numbering, breaks and others.

Figure 3:
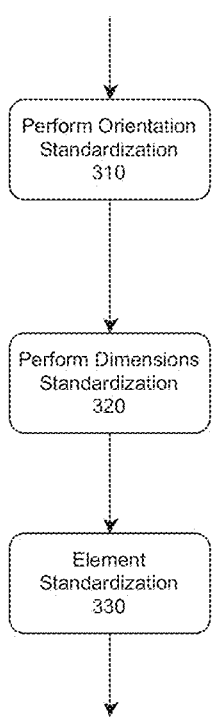
FIG. 3 is a flow chart illustrating an exemplary document standardization method in accordance with an embodiment of the invention.

FIG. 3 depicts a flowchart of some of the standardization processes that may be performed by the document intake engine 110 in accordance with an embodiment of the invention. Thus, for example, the document engine 110, after converting the document into a preferred format, may process each page of the document according a standard page orientation, rotating pages from portrait to landscape, and vice versa, at step 310, as needed. At step 320, the document intake engine 110 analyzes each page of the documents against a user-configurable standard set of dimensions. The engine 110 will adjust the size of each page of the document into a standard size, if needed. In some embodiments, the document intake engine 110, at step 330, will also adjust rotations and positions of images, paragraphs, text, and other elements of a document page (e.g., straightening of text or to make consistent placement within columns). Text and images may also be enlarged or sharpened, and the fonts may be adjusted, as needed. These and other standardization operations may facilitate the readability of the documents and improve the data extraction by the engines of the system.

After the document standardization procedures, the document intake engine 110 performs optical character recognition (OCR) at step 240. In certain instances, if the documents that are received at the system are already in a preferred format, then this step may be optional. Text, numbers, special characters, and other recognizable elements may be automatically detected by one or more OCR methods known to a person of ordinary skill in the art. In one embodiment, the system has access to a plurality of unique OCR methods and will select an OCR algorithm in accordance with the type of document to be processed, the relevant industry and/or other user-configurable settings, each of which may cause different types of characters to be recognized.

In one embodiment, the document intake engine 110 can recognize the specific types of data contained within pages of a document. For instance, the engine 110 can detect that a page contains words, numbers, monetary values, percentage-based values, stock price and volume values, other numerical based values, computer programming code, database-type data, and any other forms of known data types. The engine 110 may also detect that words in a document are in a particular language. These data types are only provided here as examples and are not meant to be limiting to the scope of the invention in any way.

In addition, the document intake engine 110 can recognize structures or forms in which data may be presented or embedded. For instance, the document intake engine 110 may recognize data on a page as sentences making up a paragraph; a table containing cells with data; images, diagrams, and info-graphics with embedded text, and others. In one embodiment, the document intake engine 110 can recognize data to be presented in a table and recognize that a row, column or cell contains text, monetary values, numerical values, and other types of data. Similarly, the document intake engine 110 can recognize that a portion of a sentence or a block paragraph on a page is a quotation of a speech made by the CEO of a company. Other structures or forms in which data may be presented or embedded may be detected by the document intake engine 110.

In one embodiment, the detection of the types of data within the detected data structure or form (e.g., data within a row, column or cell of a table) allows the document intake engine 110 to process the data with an OCR algorithm and to extract the data more accurately. For instance, where a row in a table is recognized to contain currency values, then the document intake engine 110 automatically utilizes this information to determine the dimensions of the cells within the table, such as the height and width of the cells in the table. Based on this determination, data may be accurately recognized. For instance, in instances where data spans multiple lines in a cell, the data is often wrapped from one line to the next, making data recognition and extraction difficult, as it may be difficult to determine whether the data spans to the next line or that the data in the next line belongs to a separate cell. By determining the dimensions of the cell, the content of the cell may be extracted correctly, e.g., data from one line may be combined with data in the next line within the cell, for instance. As another example, where data within a page is detected to be presented in a corporate structure chart, the document intake engine 110 may determine that each entry (e.g., box) within the chart is information of a particular person and his or her position within the company.

With these data detection features, a person of ordinary skill in the art would recognize that the detection capabilities described in this disclosure further allow embodiments of the present invention to process documents and extract relevant data automatically, and even without requiring user approval or user selection of location of data within the documents.

In at least one embodiment, the document intake engine 110 performs optical character recognition upon only a portion of a document. This may be done in order to save time and processing resources but may also be done where only a particular portion of the document needs to be processed for data extraction, e.g., where the user has indicated that he or she would only like to extract only the portion of the document or where the user is only looking for specific data type that is known to be in the particular portion of the document.

In one embodiment, to further facilitate the data recognition and extraction, the document intake engine 110 processes each document that is received at the system to determine whether it is a particular document type of document. The system may manage a library of known document types, each of which may identify a set of documents having particular content, structure, form, or other attribute. For example, he document intake engine 110 may categorize a document as a specific document type based on: a common data structure or form in which data is presented on a page, as discussed above; language; currency or type of financial data; government agency; company or source data; creation and modification data; document file type (e.g., presentation slides, text document, spreadsheets); size and other attributes of a company related to the document; and other metadata and categories that can be used to identify documents.

The library of known document types may further contain information of the locations of data, data type, amount of data, and other information regarding the data, data structures or forms within the document, and other information describing the data of the document. With this feature, the document intake engine 110 may automatically determine where relevant data may be found on a document for a given document data type. This library may further be used by the system to predict (and optionally, automatically extract) data from the document, as discussed further in this disclosure. In addition, as discussed further below, this feature may allow for the automatic detection of documents that are of the same type of a document that has been previously processed by the system for coordinate data and processed for data extraction. This would allow documents that are received in the future to be automatically processed without user action.

In some embodiments, the document intake engine 110 may process the OCRed text elements contained in each page of a document to determine one or more coordinates of each letter, word, image, and/or other document elements or components. For instance, the x- and y-coordinates of each recognized word, image, and/or other elements within each page may be determined. Furthermore, in at least one embodiment, the coordinates of these document elements may only be collected for certain users or users who would prefer this capability. In another embodiment, the document intake engine 110 may perform this process with respect to particular portions of the document, words, letters, images and/or other elements. Other coordinate-based systems may be implemented in other embodiments.

Collecting data from multiple layers of a document further allows more data to be distinctly extracted, further increasing accuracy and effectiveness of the system. As one example, documents that contain a watermark image on one or more pages may be processed to detect and extract a layer of data that contain the watermark, and separately, a layer of data containing the underlying document text. Similarly, this feature further allows a table (for example) to be extracted into two or more sets of layers.

A three-dimensional (3D) coordinate system may be implemented that further takes into consideration a depth dimension for each document element. Thus, in this embodiment, the document may be processed to detect multiple layers of data. For instance, the document may contain text overlaid on an image such that the underlying image may be determined to be on one layer while the overlaid text may be considered to be on a separate and distinct layer. The order of the coordinate determination may be dependent on the types of data that are detected to be on multiple layers. For example, where there is text detected to be in an image, the coordinates of the text may be determined first, followed by the image. Other orders may be utilized based on needs and system preferences. The coordinate data of the data elements may be stored in the data repository 150.

In addition, in one embodiment, the document intake engine 110 processes the document for other types of data, including metadata. Thus, in one embodiment, the document intake engine 110 may identify the document creator, time created, document file size, creation and modification dates, type of text in the file, version, font, names, and other metadata. This data may, in at least one embodiment, be used as a database lookup key. Indeed, in at least one other embodiment, any types of data, including any types of data that are discussed herein, may be utilized as a database lookup key. This would allow users or the system, as well as the engines of the system, to filter documents and perform searches for documents more efficiently. The collected data may be stored in the data repository 150.

After the intake of a document at the document intake engine 110 (after, e.g., steps 220, 230 or 240 depending on system preferences or embodiment) the user-interface engine 120 generates a user interface for the user at a user terminal and provides the document to the user, at step 250. A main user interface 400 in accordance with an embodiment of the present invention is depicted in FIG. 4. The user interface 400 contains a navigation panel 410, a document panel 420, a data selection panel 430, and a data extraction preview panel 440, for example.

In one embodiment, the navigation panel 410 allows a user to navigate between the documents of a set of documents. For instance, the navigation panel 410 may contain a previous document option, a next document option, and a document list option that allows the user to navigate his document set. The navigation panel may further contain a "reset" option to delete all of the user's current data selections for the current document; a "no data" option to mark the document as not containing any relevant data; and a "too complicated" option. The "too complicated" option may allow a user to indicate that the document is too complicated to accurately and effectively extract relevant data at this time. For example, this may be because the document is difficult to read, in another language, the data is obfuscated within the pages, the data is difficult to decipher or find, or because the subject matter is complicated. In certain embodiments, for example, this option may allow a user to push the current document to the end of the queue for analysis at a later time, to mark the document for manual processing, and/or to send the document to a supervisor for processing. In one additional embodiment, marking a document as "too complicated" may automatically transfer the document to a second or higher-tiered document queue for further processing by the user, or another user or team, who may be charged with handling complicated documents. The second or higher tiered document environment may require users to manually read the document and enter the relevant data fields into the system or allow a user to process the document using the coordinate-based data extraction procedure disclosed herein, but with greater attention to detail. The latter procedure, for instance, allows for simple documents to be quickly handled and entered into the system while minimizing delay by pushing more complicated documents to other queues for more specific attention.

The document panel 420 displays the image of a particular document at step 250. In the exemplary FIG. 4, a financial disclosure/filing document is displayed in the document panel 420. The document contains text and a table containing data fields establishing the schedule of assets held at the end of year of a 401(k) plan provided by a particular employer. The user may navigate the page in accordance with methods well known in the art, including panning, scrolling, zooming, and rotating the view of the document, among other available actions.

The data selection panel 430 contains a menu representing data fields of interest that may be collected from the document. As discussed in other portions of this disclosure, data fields of interests may be configured for selection within each document. The data selection panel 430 may be used to identify and extract some or all of the data from the document that correspond to the data fields of interest. As seen in FIG. 4, the data selection panel 430 will default to the first data field that a user could locate and identify—in this exemplary case—"Market Values." At step 260, the user may navigate the document to locate and select the data requested by the data fields of interest in the data selection panel 430. The user, at step 260, can select the relevant data fields by drawing directly in the document panel 420 a data selection shape over/around the data to be extracted. In one embodiment, a user may draw a data selection figure such as a selection box (i.e., a quadrilateral) that encapsulates the relevant data (e.g., via a mouse drag, click or a touch for touch-enabled devices). For instance, a user presses a primary mouse button at a starting location in the document displayed in the document panel 420, and, while holding down the primary mouse button, drags the mouse pointer across the data as to draw a selection figure that completely covers the data. In one embodiment, after a user selects an option in the data selection panel 430 (e.g., "select market values" box), the mouse cursor will automatically change to allow for the selection of data.

During or after the selection, the user is given a preview of the data selection figure (e.g., by highlighting or surrounding with lines, by highlighting the text in a different color). Thus, in FIG. 5A, a user has selected the market values using selection figure 510 in the document pane, investment name data using selection FIG. 520, and investment type data using selection figure 530. In the exemplary case depicted in FIG. 5A, after the user has selected "investment type" data by drawing selection figure 520, the data extraction preview panel 440 of FIG. 5A displays a preview of the data values contained in the selection figure 520 that corresponds to the "investment type" data on the page. Thus, after each selection, a preview of the data selected may be shown in data extraction preview panel 440. The panel may repeat this process for each field of interest and data selected.

After the user has located this first data field, the user is then asked to locate the second data field ("Manager Name"), third data field ("Investment Name"), fourth data field ("Investment Type"), and so on. Of course, a user may not be required to locate any or all of the data of the data fields of interest. In one embodiment, the order of relevant data fields are selected by the system based on the likelihood of the corresponding data's proximity to one another in order to expedite data selection and extraction. In addition, the user need not follow the order of the menu of the data fields of interest, and may proceed in any preferred order.

Embodiments of the present invention allow a user to draw a number of selection figures for each data field of interest. Therefore, the system can adequately extract data even where the data may be located at multiple locations within the document. Furthermore, in various embodiments, the user may indicate data using any type of selection shapes and need not fully encapsulate the data within a selection shape. Thus, in addition to identification using a selection figure, data may be identified using circles, triangles, lines/ underline, points, colors, highlighting, and others. In one embodiment a user may also be able to identify data by drawing a distinct shape (e.g., star) in proximity to the location of the data. For instance, a user would simply need to mark a star next to a paragraph to identify the entire paragraph as a disclosure comment data field. In some instances, the use of other shapes may allow for more accurate identification of relevant data. For instance, in documents containing data embedded in circles or oval shapes, such as those containing circle graphs, pie charts, or scatter graphs, data may be more accurately captured if the user can draw a circle to match the depicted circle(s).

Figure 5B:
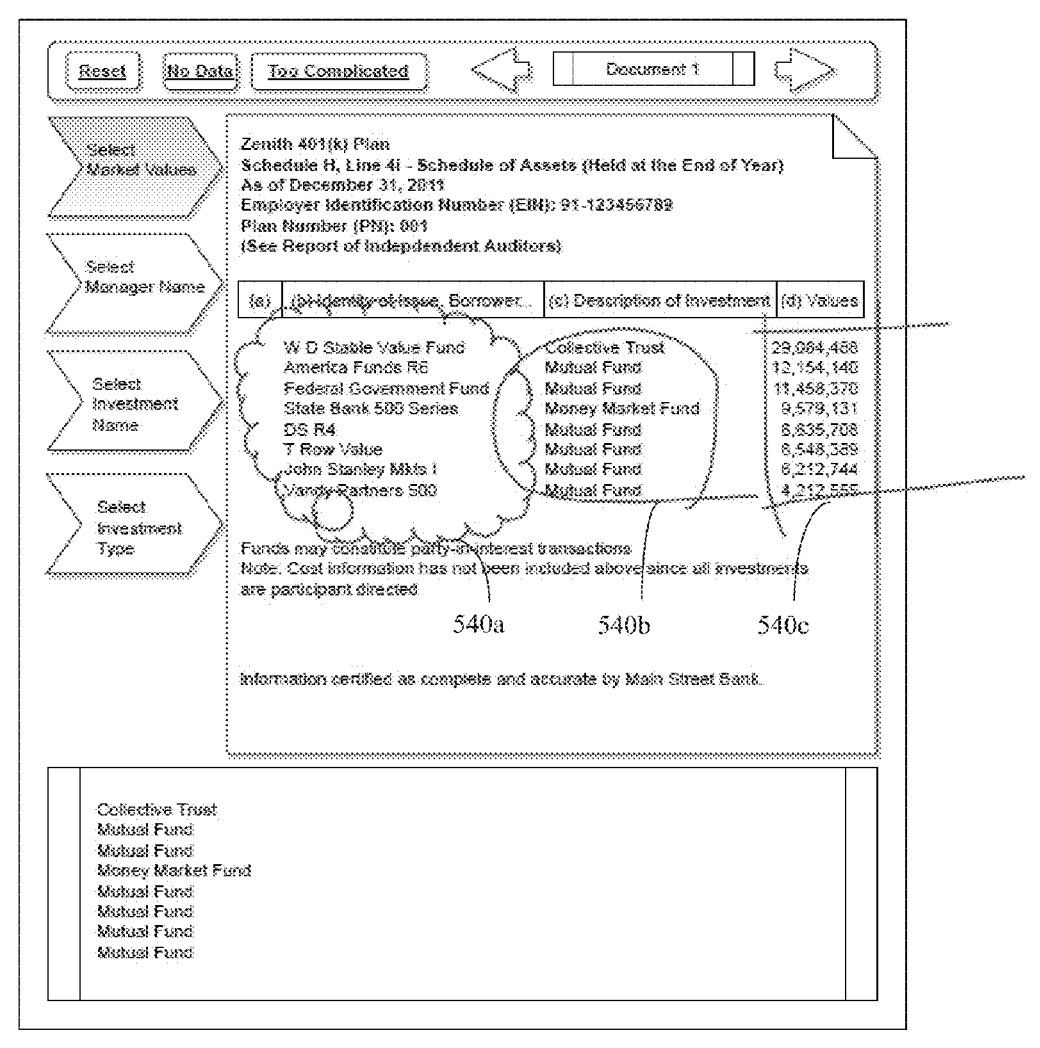

In one embodiment of the present invention, the system is configured to support manual selections. Thus, rather than requiring the user to identify data in predefined shapes, the system may allow a user to manually draw shapes or markers using document panel 420. In this embodiment, while users would be allowed to draw boxes, circles, triangles, and other shapes to identify data, the user need not be limited to these figures. Rather, the system may support any user-defined markings (including, e.g., highlighting text) that would be sufficient to determine the location of the data being identified in connection with each field of interest. For example, FIG. 5B, depicts an example of the user interface where the user has marked the market values, investment name and investment type using hand-drawn shapes using a stylus, 540a, 540b, and 540c. This embodiment represents a quick and intuitive solution that allows users to quickly identify the relevant data, even with little or no training.

In yet other embodiments, the system 100 is configured to support user selection of data without requiring the manual drawing of shapes. In these embodiments, the document intake engine may automatically detect relevant portions of a given document page to detect relevant document elements. The sizes of document elements that are detected by the engine may vary from very large (e.g., a graph making up an entire page), to very small, (e.g., a single letter). Examples of what may be considered a document element may include, a single paragraph, a column of data, each cell within a table, a slice of a pie chart, a bar in a bar graph, a figure, and so on. Based on this processing, users may quickly and efficiently select these document elements, rather than being required to draw shapes. Thus, in the document panel 420, when a user hovers his or her mouse pointer over the "current values" column of the table, the user interface engine 120 may generate a preview of the selection figure that would be created should the user select this document element. Based on this preview, the user may complete his or her selection with a single click, adjust the size and shape of the selection figure, or perform other operations. In one embodiment, this feature may be used in conjunction with the ability to demarcate data using predefined or user-drawn shapes.

Figure 5C:
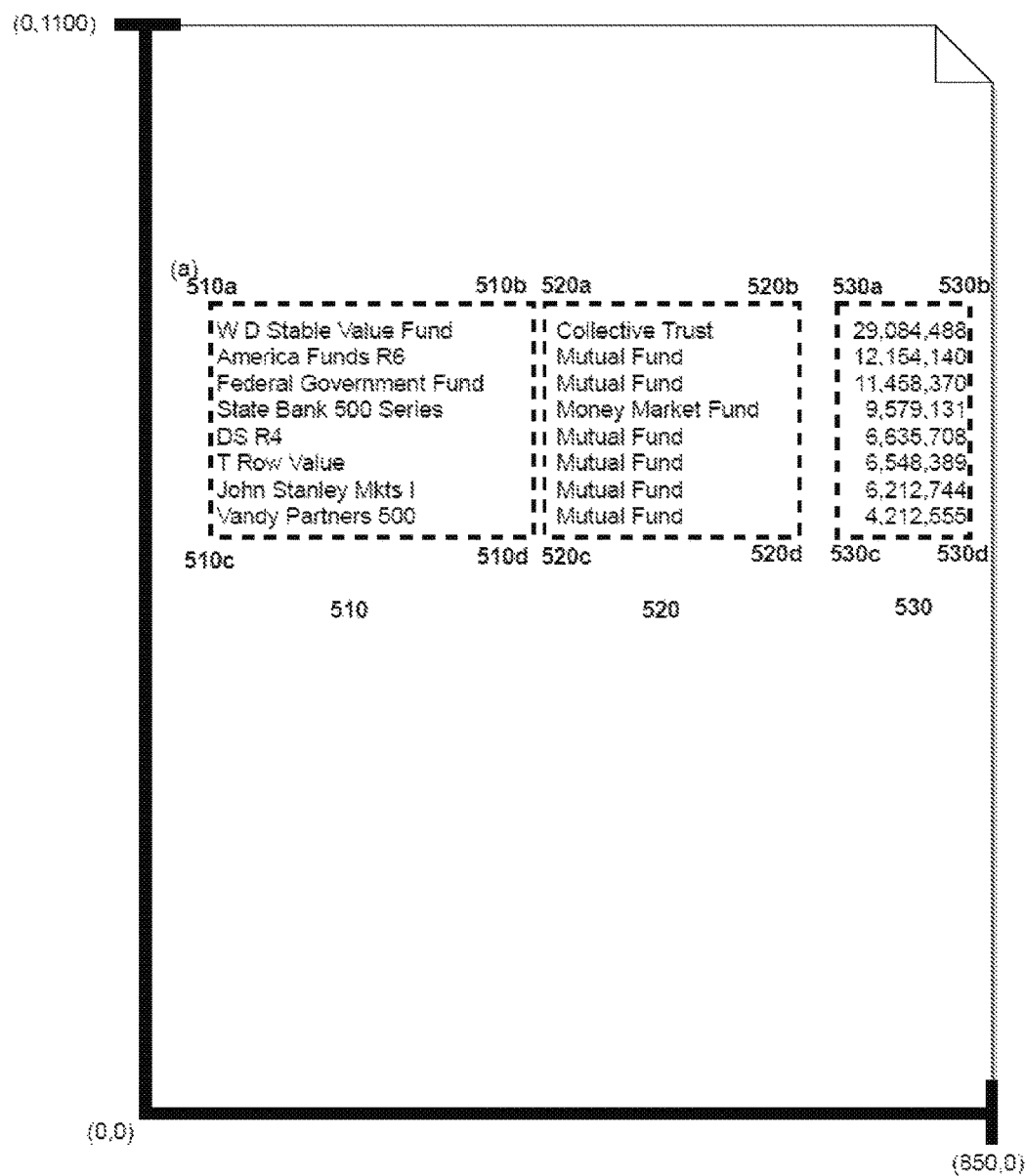
FIGS. 5*c* and 5*d* depict exemplary coordinate planes in accordance with an embodiment of the invention.

Returning again to FIG. 2, after a selection has been received, the selection engine 130 processes the user selection at step 270 to determine the coordinate data of the user selection. The coordinates representing the user's selection FIGS. 510, 520 and 530 may be determined by the selection engine 130. In one preferred embodiment, the selection engine 130 generates coordinate data that can precisely define the bounds of the user's selections with respect to each document page. For example, the document page can represent a two-dimensional coordinate plane from which the coordinates of the user's selections may be extrapolated. The document of FIG. 5A, for instance, may represent a two-dimensional plane having an x and a y axis intersecting at the bottom left corner of the page, as shown in FIG. 5C. In this example, the x-axis 560 extends 850 units, such that the right edge of the document page would have an x-coordinate of 850. The y-axis 570 may extend 1100 units, such that the upper edge of the document page would have a y-coordinate of 1100. Based on the two-dimensional plane, the selection engine 130 detects the selection with respect to the two-dimensional plane and determines that: user selection figure 510 has coordinates (100, 800), (375, 800), (100, 625), and (375, 625) (shown in FIG. 5C as coordinate 510a, 510b, 510c and 510d); selection figure 520 has coordinates (385, 800), (600, 800), (385, 625), and (600, 625) (shown in FIG. 5C as coordinates 520a, 520b, 520c, and 520d); and selection figure 530 has coordinates (700, 800), (820, 800), (700, 625), and (820, 625) (shown in FIG. 5C as coordinates 530a, 530b, 530c, and 530d).

Figure 5D:
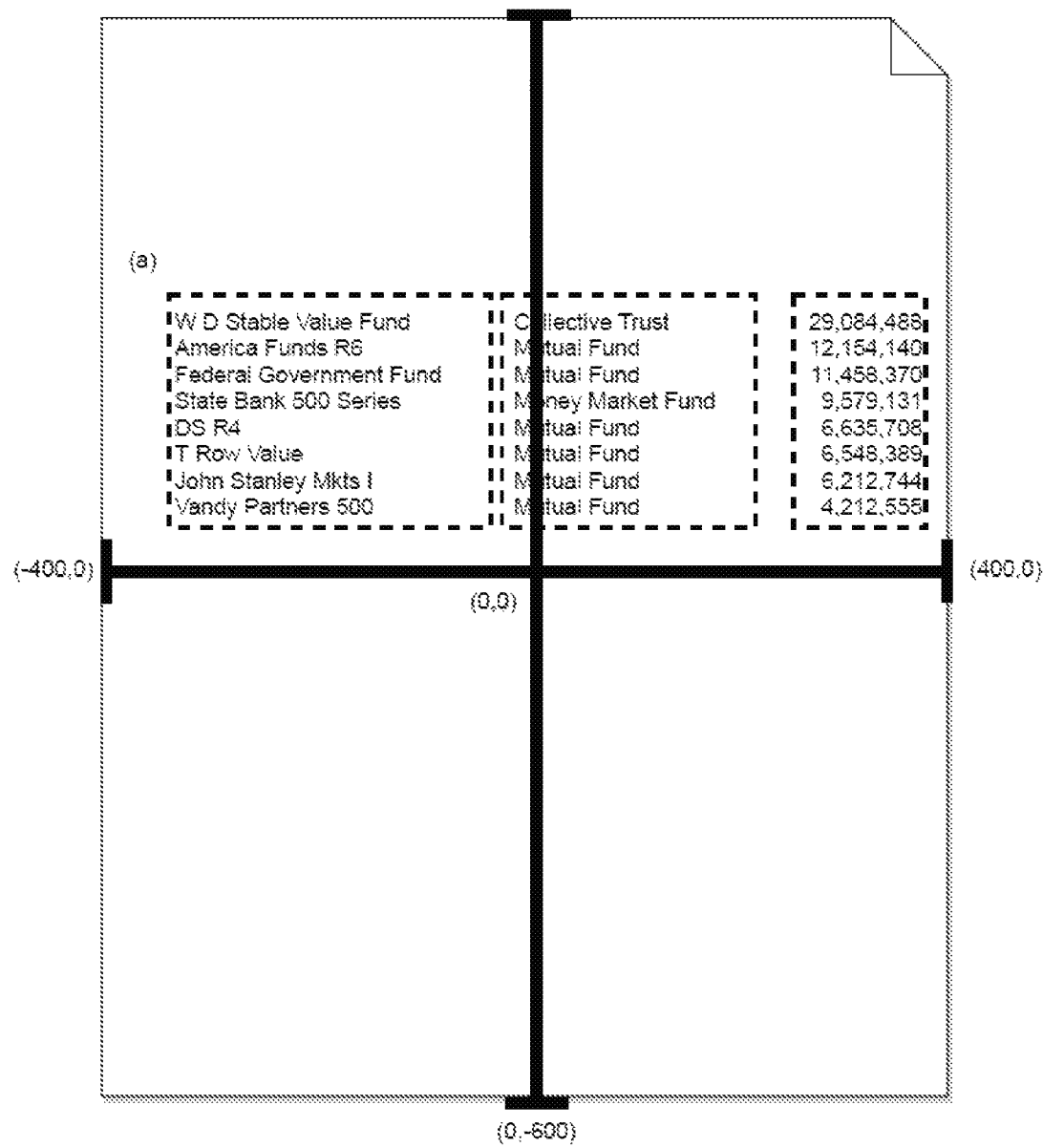

In this example, a 1100 by 850 coordinate plane is utilized wherein the origin is at the bottom-left corner of the page. However, a person of ordinary skill would recognize that in other embodiments of the present invention, more or less units may be utilized in defining each axis. For instance, in one embodiment, the plane may be 300,000 units by 400,000 units and in another embodiment, the plane may be 20 by 10 units. More or less units may be utilized to provide for greater or less detailed coordinate data. The selection engine 130 will automatically determine the closest coordinate corresponding to a selection if a point (e.g., a corner of a selection) does not exactly correspond to a coordinate. The closest coordinate will be determined. Furthermore, the origin (i.e., the intersection point of the axes) need not be at the bottom left and may be at any location within the page or document(s). For example, FIG. 5D depicts a coordinate system in accordance with an embodiment of the invention wherein the axes intersect at the center of the page. Thus, in at least one embodiment, the coordinate data may contain positive and negative coordinate data. In addition, the ratio of units measuring the x-axis and the y-axis need not meet any ratio. For instance, even in a plane where the axes equal in length, the plane may measure 500 units by 200 units.

In one embodiment, the coordinate data is determined based on the bounds of the user's selection with respect to a portion of the document or the entire document. Thus, the entire document or a section of the document may be considered a single continuous coordinate plane. This defined section may be defined according to the user's selection or administrative preferences. For example, where the user's selection figure are only contained within the last 5 pages of a document, then the selection engine 130 may gather the coordinate data using the last 5 pages as the coordinate plane. Documents may also be separated for coordinate determination purposes based not only on the number of pages, size or other attributes of the document, but also based on lines, chapters, sections, and so on.

For example, where the selection is in the shape of a box (i.e., a quadrilateral), it may be represented by a selection identifier, a data field identifier, and at least two sets of coordinates that represent the coordinates of two (opposite ended) corners of the box. As another example, where the selection is a circle, the coordinate data can include coordinate data of the center of the circle and data describing the radius of the circle. For ovals, the coordinate data may describe multiple radii of the oval. In addition, where the selection is a predefined shape (e.g., a star), the coordinate data may include the coordinates of the center of the predefined shape and data describing the size of the predefined shape as drawn by the user on the document panel 320 (e.g., 2 times a default size). More or less coordinates may be utilized.

Various coordinate systems may be utilized including those that are more or less than two dimensions, including systems that utilize Cartesian coordinates, polar coordinates, cylindrical and spherical coordinates, homogenous coordinates, log-polar coordinates, Plucker coordinates, generalized coordinates, parallel coordinates, barycentric coordinates, and others. Other supported coordinate systems may have multiple axes, and may further take into consideration time and other data. For instance, in one embodiment, a three-dimensional coordinate system may be implemented in determining coordinates of user selections that further takes into consideration a depth dimension for each document element. Thus, in this embodiment, the document may be processed to detect multiple layers of data. For instance, the document may contain text overlaid on an image such that the underlying image may be determined to be on one layer while the overlaid text may be considered to be on a separate and distinct layer. The selection engine 130, based on the selection, may automatically determine whether a user selection is referring to one or more layers. In one embodiment, the user is asked to confirm which layer of the data the user is interested in and may be shown the different data output that would extracted depending on the layer(s) selected.

In one embodiment, the selection engine 130 may automatically adjust the coordinates so as to include more or less area of the document page than what was by the user. This may operate as a buffer for user selection error. For example, users may inadvertently leave out some portions of a word, number, paragraph, image (and so on) when drawing the selection figure. In one embodiment, the selection engine 130 will automatically detect that the words, numbers, paragraphs, images (and so on) have been left out and may automatically adjust the coordinates to collect this data. The selection engine 130 may also ask the user, in such instances, if he or she meant to select a larger selection figure and may show the user a preview of the differences between the user-selected selection figure and the system-selected selection. Similarly, the selection engine 130, in certain embodiments, may also reduce the size of the selection figure. For example, it may detect that there is extraneous white space contained in the selection figure. In some embodiments, the selection engine 130 may detect that there is extraneous text or other extraneous document elements contained in the selection figure. Therefore, in certain embodiments, the selection engine 130 operates to optimize the performance of the system and improve data detection and extraction by optimizing the coordinates that are collected.

The selection engine 130 may store the generated coordinate data to the data repository 160 for access by the coordinate-based data extraction engine 140.

Figure 6:
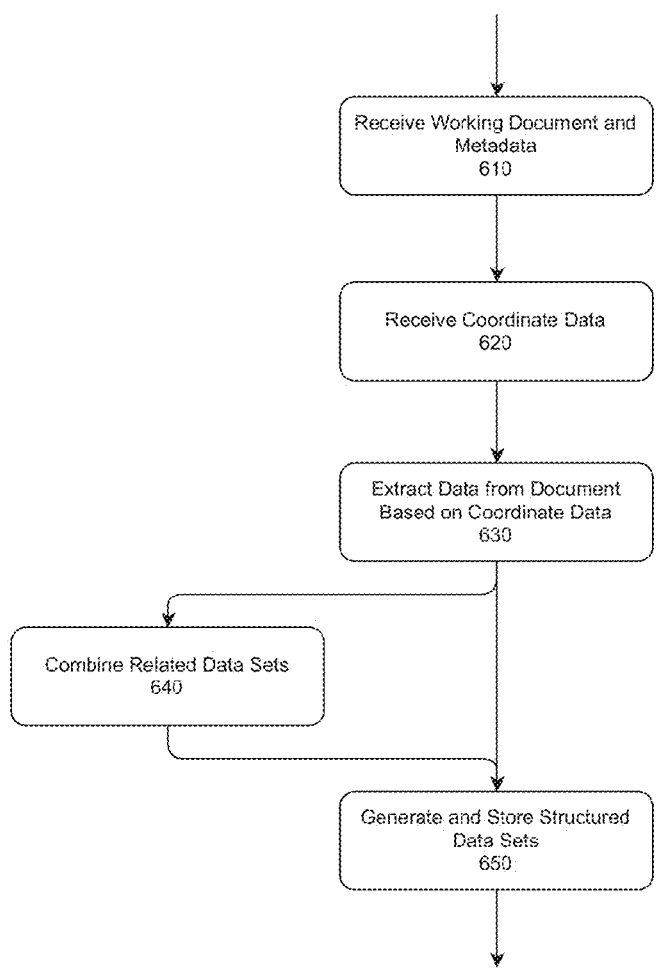
FIG. 6 is a flow chart illustrating an exemplary method for extracting data using coordinate data in accordance with an embodiment of the invention.

After the extraction of the coordinate data, the coordinate-based data extraction engine 140 extracts the data contained within the user selection(s) at step 280 to generate structured data and data sets. A flow chart of the data extraction process performed by the data extraction engine 140 in accordance with an embodiment of the present invention is depicted as a flow chart in FIG. 6. At step 610, the coordinate-based data extraction engine 140 receives a document file, which may include metadata. In embodiments where coordinates of document elements are extracted, this data is also received by the engine 140 at step 610. At step 620, the coordinate-based data extraction engine 140 receives the coordinate data, either directly from the selection engine 130 or via the data repository 160.

At step 630, the coordinate-based data extraction engine 140 identifies and extracts the characters, numbers, digits and other data that are extractable from the document that are contained in the user's selection for each set of data selection coordinates. The extraction engine 140 automatically detects when there are multiple instances of data corresponding to a data field contained in the user selection. Alternatively, embodiments of the present invention allow for users to select large portions of document pages to extract multiple instances of data for each data field of interest. The extraction engine 140 may automatically detect that there are multiple instances of data corresponding to a data field of interest because the datum are each separated by a new line, by a comma, by a space, by a tab, or by other delimiters, for example. In the exemplary financial disclosure document depicted in the user interface of FIGS. 4 and 5, for example, users can select an entire list of "Manager Names" or "Investment Names." The system will automatically detect that there are 8 instances of data for each of these data fields of interest. The extraction engine 140 may take into consideration how multiple instances of the data fields are normally represented on a page. For instance, the extraction engine 140 may automatically determine that each instance of a "market value" of FIG. 5A is ordinarily separated by a new line. Accordingly, upon interpreting the data extracted from selection figure 510, the extraction engine 140 automatically determines that each additional line below the "29,084,488" entry are additional instances of "market value."

Furthermore, the extraction engine 140 may take into consideration the composition of the instances of data corresponding to each field of interest. For example, the extraction engine 140 may detect that the "market values" field is made up of large, multi-digit numbers (e.g., "29,084,588")

and determines the digits represent one number, as opposed to multiple instances of "market values."

For each set of selection coordinates, the extraction engine 140 automatically extracts relevant text and generates structured data set therefrom at step 650. For instance, the extraction engine 140 may extract each of the 8 instances of data corresponding to "investment name" (as shown in user selection 510 of FIG. 5A) (e.g., "W D Stable Value Fund," "America Funds R6," and so on) and generate a structured data set containing each of these 8 instances of data. The structured data sets may be stored at the data repository 160.

At step 640, after two or more sets of structured data sets have been extracted, the extraction engine 140 may determine whether one or more structured data sets are related. The extraction engine 140 determines whether there is a correspondence between the instances of the data sets based on the coordinate data sets of two or more user selections. More particularly, the extraction engine 140 automatically determines that the coordinates of selection figure 510, selection figure 520 and selection figure 530 each cover a common span of x-coordinates. Furthermore, the extraction engine 140 may detect that each of the data sets covered by selection FIGS. 510, 520 and 530 contains the same number of data instances, in this case, 8 rows of data. Based on these and other common attributes, the extraction engine may determine that the data sets are related. Based on the coordinates of each line of text, instances of related data are combined with one another. For instance, "W D Stable Value Fund" is automatically detected to be related to "Collective Trust" and "29,084,488." This is repeated for each instance of data for which the relationship is detected (e.g., for each of the 8 rows contained in the table of the document). The structured data sets are generated and then stored at data repository 160. At step 650, the data extraction process is complete.

In one embodiment, an administrator may configure the system to combine the data corresponding to selected data fields of interest into one or more structured data sets. For instance, the system may contain one or more relational databases that define the relevant data fields in a relational fashion. Thus, in the example depicted in FIG. 5A, an administrator may configure the system to identify that "market value," "manager name," "investment name," and "investment type" data should be combined into one structured data set.

In one embodiment, the extraction engine 140 may be configured to extract data using grammar and language-based rules in order to accurately detect data corresponding to selected data fields of interest that are related and that may be combined into one or more structured data sets. For example, in identifying data related to contact information, the document may automatically detect phone numbers, email addresses, names and other contact-related data when it detects a sentence in the document that states, for instance: "Should you have any question regarding this correspondence, please contact ABC at 555.555.5555 or ABC@defg.com." The extraction engine 140 will then apply language and grammar rules to determine that the name of the contact is "ABC", the phone number is "555.555.5555" and the email is "ABC@defg.com". In one embodiment, the extraction engine 140 detects keywords within sentences—such as "contact" in the above example in order to detect that the sentence may contain relevant contact information. Furthermore, the extraction engine 140 may use the location of the detected keywords to detect data that is proximately located within the page.

The extraction engine 140 may be configured to take into consideration that one or more of the data fields of interest may be located in close proximity to others. For example, the extraction engine 140 processing the investment document type depicted in FIG. 5A may contain a relational database entry that describes that investment name, investment type and market value data are typically displayed on the same line or at proximate locations within a document page. The extraction engine 140 may, therefore, be configured to take into consideration such location relational data during the extraction process to further improve data detection and extraction.

Figure 7:
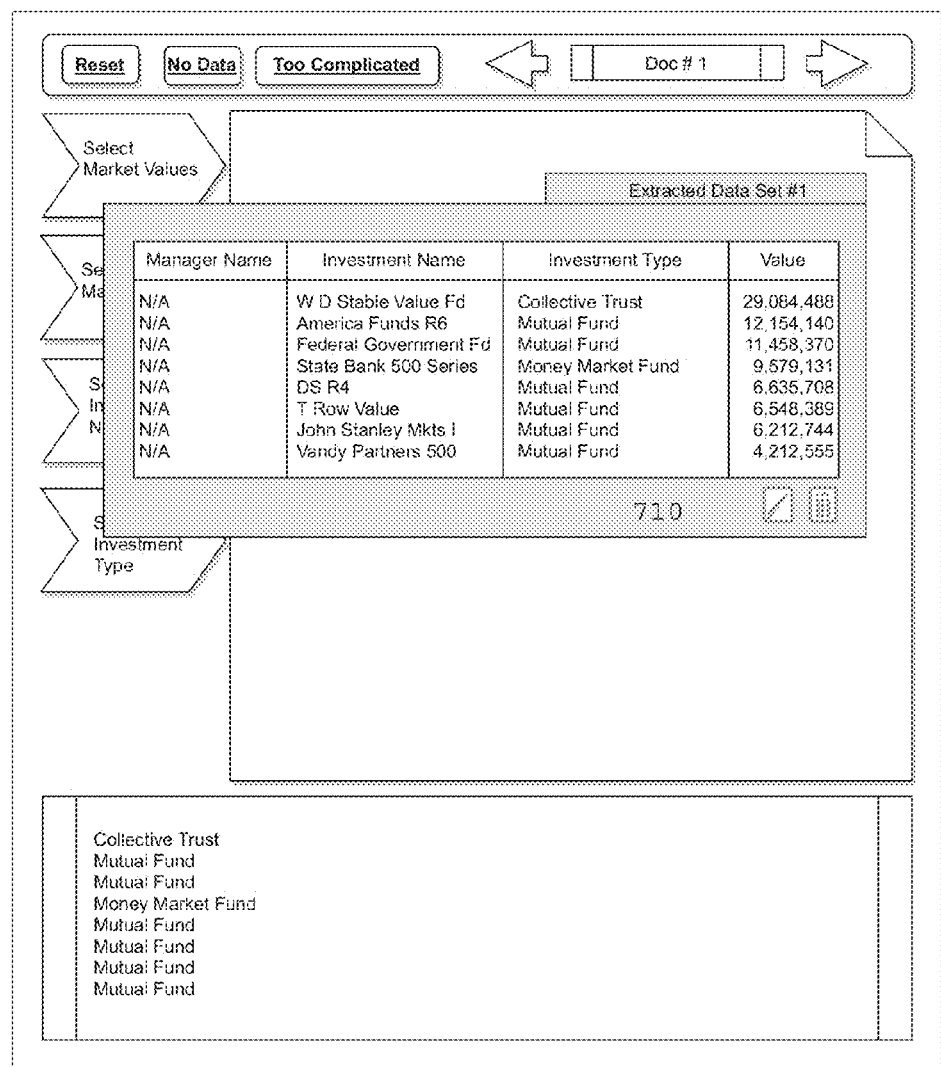
FIG. 7 is another exemplary user interface displayed to a user in accordance with an embodiment of the invention.

Returning to the method of FIG. 2, after the data extraction process at step 280, the user is shown the structured data set generated at step 290. Thus, the user may be shown the data extraction result interface 700 of FIG. 7. The data extraction result interface contains a result panel 710 that describes the structured data set. It should be noted that in the exemplary document, the document did not contain any data related to "manager name." Therefore, when the generated data set is generated, no data is extracted for this field.

In an embodiment, the extraction result interface 700 is interactive to allow a user to manually edit entries in the generated data set, as necessary. A user may compare the data against the original PDF document, which may be shown in a document panel (not shown in FIG. 7). In addition, the user may have the option to navigate to view all of the generated data sets and combine one or more structured data sets by selecting one or more of the generated data sets for combining. At step 295, the user may confirm the data, whereupon the generated structured data set may be stored at the data repository 160 or other locations for use. In one embodiment, the structured data set is stored in a file at the data repository and in at least one embodiment, the file is in a specific document format such as eXtensible Markup Language (XML), though various other documents formats known by persons of ordinary skill in the art may be utilized. The user may then move onto the next document, if so desired. The method for document processing and data extraction ends when all documents desired for data extraction have been processed.

Figure 8:
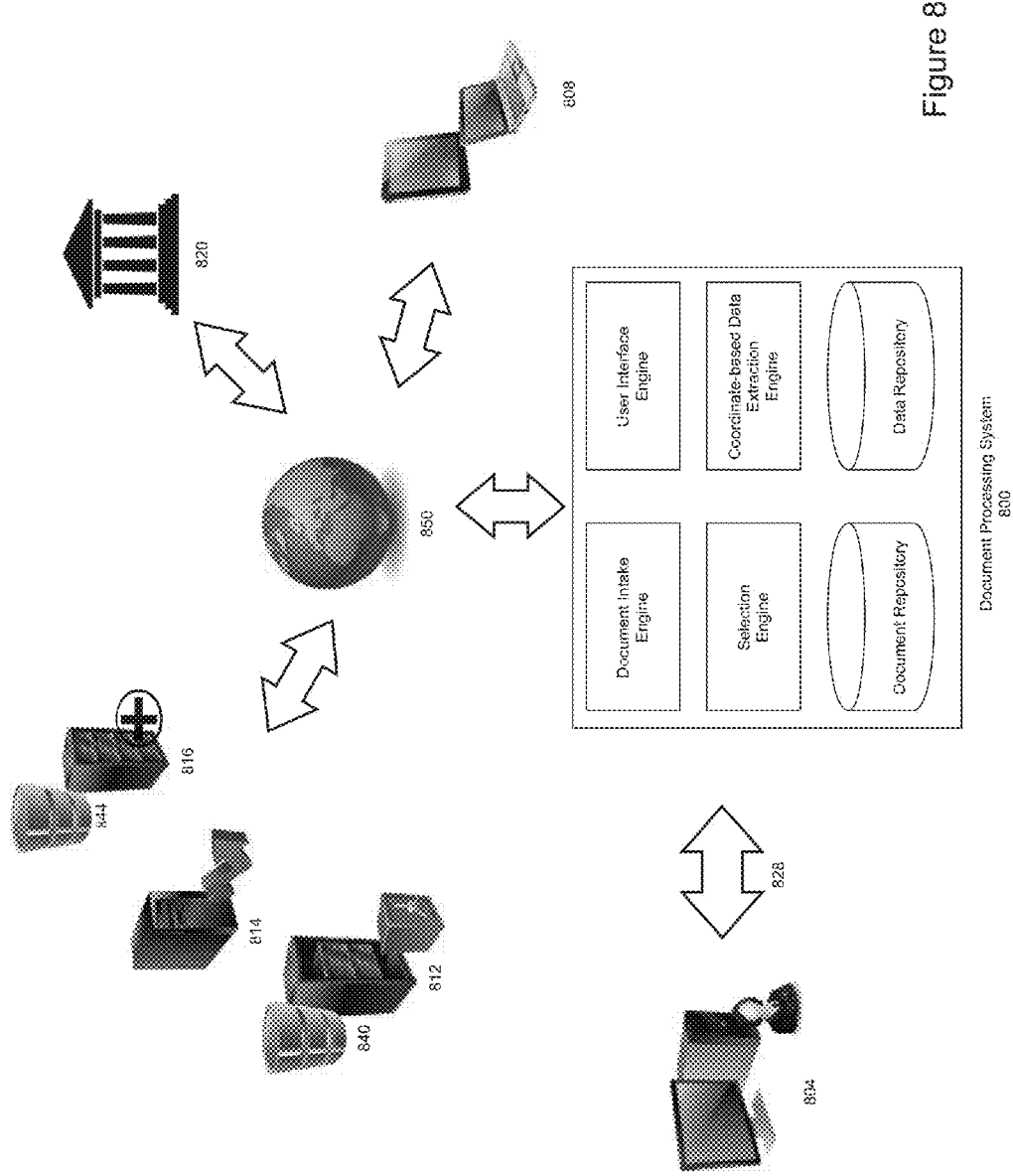
FIG. 8 is a block diagram illustrating an operating environment for a document processing and data extraction system in accordance with an embodiment of the invention.

FIG. 8 depicts a document processing system 800 in accordance with another embodiment of the present invention. The document processing system 800, which may contain some or all of the engines, repositories, and other components of document processing system 100, may be connected to user terminals 804, 808; a plurality of external systems 812 to 816; and regulatory agency 820. The processing system 800 may be connected to these and other systems via network 850, which may be made up of one or more networks, including the Internet. Furthermore, the user terminal 804 may be connected to the document processing system 800 via a local network or local connection 828. A user terminal 808 may connect to the document processing system 800 (and other systems) via network 850. The plurality of external computer systems 812 to 816 may be systems of companies and individuals from which documents may be received for data extraction and processing. In addition, the plurality of external computer systems 812 to 816 may also be systems to which extracted/generated data sets are delivered. Thus, these systems 812-816 may be companies from which filing documents may be received and/or where extracted data are utilized in the ordinary course of business. Regulatory agency 820 may be an agency such as the Securities and Exchange Commission or the U.S. Department of Health & Human Services, from which data may be received from and/or delivered to after data extraction.

The system's connection to other systems that are internal and external to a company may allow users of the document processing system 800 to retrieve documents from any number of network-connected sources, process the documents for relevant data, and return relevant results to even other sources. For instance, a user terminal 808 located in Paris, France may interact with the document processing system 800 to cause the system 800 to perform data extraction tasks for a set of documents provided by the user terminal 808. The user terminal 808 may also provide the document processing system 800 with access to a document repository 840 located in Bombay, India. The system 800 may automatically connect terminal 808, computer system 812 and repository 840 to retrieve the documents, process the documents for intake, facilitate the selection of data and extract the relevant data to generate data sets. The system 800 may then be caused to store the generated data sets in a database 844 associated with computer system 816 located in San Francisco, Calif. and facilitate the filing of relevant digital documents with agency 820. Thus, it should be readily apparent that the document processing system's accessibility via one or more computer networks allows a number of useful actions to be taken.

The document processing system may further contain various other engines and modules (not shown). In one embodiment, the document processing system may contain and administrator engine that allows an administrator to define the attributes, rules and other operations of the document processing system. For instance, an administrator may configure what data fields of interest should be located within a particular type or category of documents, including various attribute and relational data for each data field. In various embodiments, the system may operate to facilitate the extraction of data corresponding to default, custom, as well as modified data fields of interest. An administrator may have access to a plurality of user interfaces that allow the administrator to manage these data fields of interests and create, modify or delete data fields of interest, as necessary. Furthermore, the administrator may set the data fields of interests for any document, type of document or according to any number of document attributes (e.g., source, size, location, date, etc.). Furthermore, an administrator may configure the default data formats, the coordinate system utilized by the document processing system, and other attributes or functions of the document processing system. According to the administrator-defined settings, the user interface engine will generate the user interfaces to facilitate the user with extracting data from the documents.

It should also be readily apparent that the document processing system may be implemented as part of or integrated into existing computer systems, including existing systems that rely upon and/or process documents that require data processing and extraction. With such integration, the document processing system may store documents in existing repositories/document databases, process the documents for relevant data files, and store the detected structured data sets into existing databases that store such data. Therefore, the system may configured to support existing document formats and configured to generate data sets into a data format or structure that is already utilized by the existing database or system.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system, terminals and other computers discussed herein may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

As discussed herein, the document processing system and method includes the capability to handle documents in many different document formats. Furthermore, while Portal Document Format (PDF) is a preferred document format for data extraction (including the data extraction based on coordinate data) in one embodiment, various other document formats may also be supported. In particular embodiments, the system may support numerous formats that are ordinarily utilized in the particular industries in which the system is primarily utilized. For example, embodiments may support one or more of the following formats: Portal Document Format (PDF); XML—eXtensible Markup Language; XSD—XML Schema files, TXT—ASCII Unicode plaintext Text file, HTML—HyperText Markup Language (.html, .htm); and others. Indeed, the system can support many other document-based formats, such as: DOC, DOCX, DOT—Microsoft Word; DOTX—Open Office XML text document template); EGT—EGT Universal Document; EPUB—EPUB open standard for e-books; EZW—Reagency Systems easyOFFER document; FTM—Fielded Text Meta; FTX—Fielded Tex; GDOC—Google Drive Document; HWP—Haansoft (Hancom) Hangul Word Processor document; HWPML—Haansoft Hangul Word Processor Markup Language document; LWP—Lotus Word Pro; MBP—metadata for Mobipocket document; MCW—Microsoft Word for Macintosh; Mobi—Mobipocket documents; NB—Mathematica Notebook; NBP—Mathematica Player Notebook; ODM—OpenDocument master document; ODT—OpenDocument text document; OTT—OpenDocument text document template; OMM—OmmWriter text document; PAGES—Apple Pages document; PAP—Papyrus word processor document; PDAX—Portable Document Archive (PDA) document index file; PDF—Portable Document Format; Radix-64; RTF—Rich Text document; QUOX—Question Object File Format for Quobject Designer or Quobject Explorer; RPT—Crystal Reports; SDW—StarWriter text document, used in earlier versions of StarOffice; STW—OpenOffice.org XML (obsolete) text document template; Sxw—OpenOffice.org XML (obsolete) text document; TeX—TEX; INFO—Texinfo; Troff; TXT—ASCII nebo Unicode plaintext Text file; UOF—Uniform Office Format UOML—Unique Object Markup Language; VIA—Revoware VIA Document Project File; WPD—WordPerfect document; WPS, WPT—Microsoft Works document and template; WRD—WordIt! Document; WRF—ThinkFree Write; WRI—Microsoft Write document; XHTML (xhtml, XHT)—eXtensible Hyper-Text Markup Language; and XML—eXtensible Markup Language; XPS—Open XML Paper Specification. In addition to these formats, the system can also support image-specific formats: image or graphic formats, such as: GIF—CompuServe's Graphics Interchange Format; JPEG, JFIF (.jpg or .jpeg)—Joint Photographic Experts Group; BMP—Microsoft Windows Bitmap formatted image; PNG—Portable Network Graphic; PSD, PDD—Adobe Photoshop Drawing; TIFF (.tif or .tiff)—Tagged Image File Format; and others. Other types of documents that may be supported include, but are not limited to, spreadsheet formats, computer programming files, and presentation type files (e.g., power points).

Figure 9:
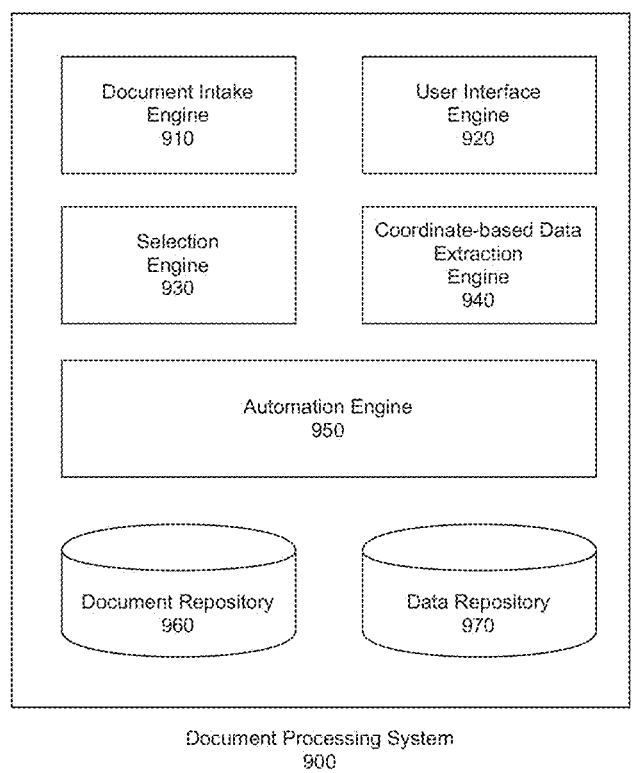
FIG. 9 is a block diagram illustrating a document processing and data extraction system in accordance with another embodiment of the invention.

FIG. 9 depicts a document processing system 900 in accordance with yet another embodiment of the present invention. As seen, the document processing system comprises a document intake engine 910, a user interface engine 920, a selection engine 930, a coordinate-based data extraction engine 940, an automation engine 950, a document repository 960, and a data repository 970. The document processing system 900 of the present invention further automates the document processing and data extraction process using the automation engine 950, which can automatically process documents received at the system to generate data selection, and therefore automatically generate coordinates therefrom.

During the user-assisted document processing and data extraction process, such as during the process described with respect to FIG. 2 and the system 100 of FIG. 1, the automation engine 950 may be configured to automatically evaluate the documents that are being processed to detect similar documents. In one embodiment, the automation engine 950 detects documents that are similar to one another by detecting common attributes across documents. Examples of attributes that may indicate similar documents include those containing common keywords, such as those contained in document titles or metadata (e.g., "401(k)"); common document structure, such as those containing a similarly-structured table; common source(s) or destination(s), such as those documents from a common company or having a common company identifier; common data fields of interests (e.g., "market values," "investment name"); common source or destination systems, such as those documents originating from within the same internet (IP) protocol address or Global Positioning System (GPS) coordinates; and common metadata such as creation/edit date, geolocation, author, etc. By detecting similar documents, the automation engine 950 can automatically process newly received documents to extract relevant data using previously-entered selections. In one embodiment, the automation engine 950 will perform the document extraction and alert the user with the results automatically. The automation engine may ask the user to verify that the results are accurate and allow the user to edit the results as he or she may desire.

Figure 10:
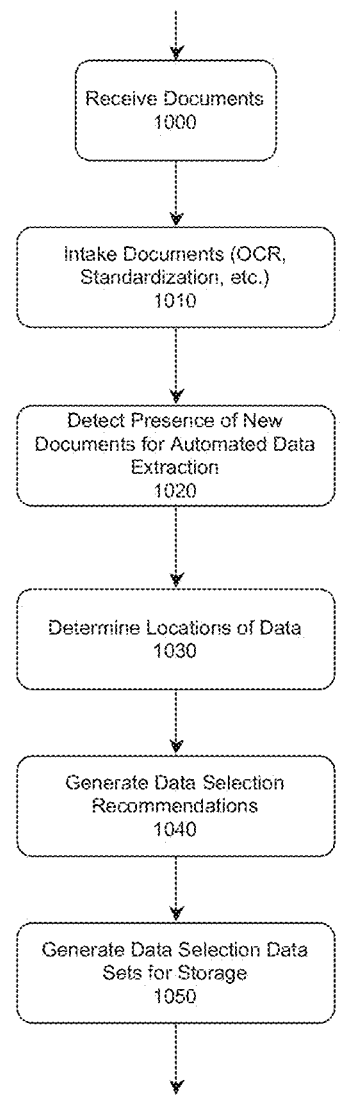
FIG. 10 is a flow chart illustrating an exemplary method for automated document processing and data extraction in accordance with an embodiment of the invention.

The features of this embodiment can be illustrated using the flowchart of a method for automated document processing and data extraction depicted in FIG. 10. At step 1000, documents are received at the system 900. At step 1010, the documents are processed by the document intake engine 910, whereupon the processed documents, which may be OCRed and in PDF format for example, are stored at the document repository 960, along with metadata. Beginning at step 1020, the automation engine 950 detects the presence of newly received documents in the document repository and proceeds to determine whether data may be automatically extracted.

In particular, the document processing system 900, at step 1020, determines whether the document is similar to other documents that have been previously processed. For instance, the system 900, at step 1020, may recognize that a newly received document is a 401(k) plan disclosure document containing similar traits as that shown in FIG. 5*a* by recognizing that the document contains: the title of the document that also includes "401(k) Plan" and "Schedule"; includes a table with columns that also contain keywords "identity of . . . party," "description . . . of investment," and "value"; contains a similar relevant date of "Dec. 31, 2012"; and is being received within a month of the previously received documents. In some embodiments, the user may be asked whether or not one or more documents should be processed according to previous processing selections or sessions. Therefore, the system is capable of predicting selections for new documents based upon previously-processed documents.

In at least one embodiment, a user may select one or more unprocessed documents for automatic data detection and extraction as discussed herein. The user may then designate a previously performed selection of data fields of interest, data selection, coordinate designation, and/or extraction process. In one embodiment, the user may identify one or more documents that have been previously processed, including by grouping, type, author, source, size, date or other document or general attributes from which previous processing may be identified. In at least one embodiment, the user's identification may be saved as a processing template that may be used in the future. In response, the document processing system 900 will automatically process the new, unprocessed documents according to the processing attributes or selections of the previously-processed documents and/or coordinate data, as discussed further below.

At step 1030, the automation engine 950 first attempts to place the selection figures at the same coordinate locations in the new document as the user previously entered for similar documents. To the extent that partial sets of relevant data are detected, the automation engine 950 may automatically make adjustments to the selection figure(s) location or size, such as moving the figure up or down, until all available nearby data is captured within the selection figure. If there are still fields of interest that are not detected using the user's previously submitted selections, the automation engine 950 attempts to locate the relevant data by, e.g., searching for keywords, etc., that are near selected data, as may be determined from previously processed documents. Similarly, if relevant data fields are known to be extracted directly from a table or other structured format, the automation engine will search for the presence of such a table or structure. It should be readily apparent that the system is capable of detecting the presence of locations through any number of algorithms, some of which may be more optimal for one particular type of document over others.

In one embodiment, at step 1040, the automation engine 950 causes the automatically generated selection figure(s) to be communicated to the user interface engine 920 for display to the user, and to the selection engine 930 to generate the coordinate data. The user may review the figure(s), at step 1050, and adjust as necessary, and if he or she proceeds, the data extraction engine 950 may extract the data based on the coordinate data, generate structured data sets, and store the results in the data repository 970 (and other locations), at step 1050.

In one embodiment of the present invention, the automation engine 910 provides to the user data recommended selection figures when the document is loaded for data extraction. In other words, just prior to the display of a document page to the user, the automation engine 950 process a document to predict the locations of the data of interest and will generate recommended data selection figures that are displayed to the user as part of the document panel, similar to that shown in the user-interface of FIG. 5*a*. A user may then review, modify (e.g., move, resize), accept, or reject the recommended selection figures, may accept, modify (e.g., move, resize), or otherwise, reject the recommendation. Thus, in these embodiments, the automation engine 910 may be configured to further improve the efficiency of the document processing and data extraction process.

In at least one embodiment of the present invention, the automation engine 950, after locating the relevant data fields (step 1030) based upon previously processed documents, will automatically proceed to determine the corresponding coordinate data, extract the data, and generate the structured data sets without requiring user approval of recommended data selection figures. Furthermore, the automation engine may store the structured data set at the data repository 970. In one additional embodiment, the user may also be shown the generated data structured data sets and may be allowed to make any modifications or edits as desired. In addition, the user may have the option to navigate to view all of the generated data sets and combine one or more structured data sets by selecting one or more of the generated data sets for combining.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented method for document processing and data extraction, over a network, the method comprising the steps of:

receiving a first document at a processor, the first document containing data for extraction, wherein the processor performs at least the following:

outputting the document in a preferred document format;

receiving a selection of a first portion of the document;

recognizing a type of data contained in the selection, wherein the type of data includes at least one type of text and at least one type of image;

processing the first portion to extract a first layer of data and a second layer of data, wherein the first layer of data includes a plurality of text entries, and the second layer of data includes an image;

automatically generating, based on the step of processing, a plurality of coordinate sets for the plurality of text entries;

extracting, based on the plurality of coordinate sets, the plurality of text entries from the first layer;

extracting the image from the second layer, wherein each of the one or more layers is extracted separately based on the at least one user preference;

automatically generating and storing in computer memory, a structured data set that includes the extracted text data, the extracted text data being structured in the structured data set based on coordinates of the extracted text data;

automatically generating an extraction rule based on the generated plurality of coordinate sets and the structured data set, the extraction rule executable by the processor to extract text entries of the at least one type of text from a second document received after the first document;

receiving the second document from a computer system;

automatically matching the second document based on the step of automatically generating the extraction rule; and extracting, based on the step of matching, data from the second document by executing the generated extraction rule, including based at least on a portion of the generated plurality of coordinate sets.

2. The method of claim 1, wherein the selection is a figure overlying the data for extraction.

3. The method of claim 2, wherein at least one coordinate set identifies the location on the document of the selection.

4. The method of claim 2, wherein the figure is created by a user at a user terminal displaying the document.

5. The method of claim 2, wherein the figure is a shape.

6. The method of claim 1, wherein the plurality of extracted text entries is associated with a first data field of interest.

7. The method of claim 1, wherein the preferred document format is a machine readable fixed-layout flat document format.

8. The method of claim 1, further comprising converting, using at least one processor, the first document into a preferred document format based on an optical character recognition process.

9. The method of claim 1, wherein the preferred document format is a portable document format (PDF) format.

10. The method of claim 1, further comprising a step of scaling at least one page of the document to a set of dimensions.

11. The method of claim 1, wherein the structured data set is stored in computer memory in a desired file format.

12. The method of claim 11, wherein the desired file format is eXtensible Markup Language (XML).

13. The method of claim 1, further comprising the step of generating, using at least one processor, a user interface for display to a user, the user interface capable of selectively displaying the at least one document and the generated structured data sets.

14. A system for document processing and data extraction using coordinate selection data over a network, the system comprising:
non-transitory memory; and
at least one computer processor accessing the non-transitory memory and executing instructions to perform steps including:
receiving a first document, the first document containing data for extraction;
outputting the document in a preferred document format;
receiving a selection of a first portion of the document;
recognizing a type of data contained in the selection, wherein the type of data includes at least one type of text and at least one type of image;
processing the first portion to extract a first layer of data and a second layer of data, wherein the first layer of data includes a plurality of text entries, and the second layer of data includes an image;
generating, based on the step of processing, a plurality of coordinate sets for the plurality of text entries;
extracting, based on the plurality of coordinate sets, the plurality of text entries from the first layer;
extracting the image from the second layer, wherein each of the one or more layers is extracted separately based on the at least one user preference;
automatically generating, and storing in the non-transitory memory, a structured data set that includes the extracted data, the extracted data being structured in the structured data set based on coordinates of the extracted data;
automatically generating an extraction rule based on the generated plurality of coordinate sets and the structured data set, the extraction rule executable by the at least one processor to extract text entries of the at least one type of text from a second document received after the first document;
receiving the second document from a computer system;
automatically matching the second document based on the step of automatically generating the extraction rule; and
extracting, based on the step of matching, data from the second document by executing the generated extraction rule, including based at least on a portion of the generated plurality of coordinate sets.

15. The system of claim 14, wherein the selection is a figure overlaying at least a portion of the data for extraction and at least one coordinate set identifies the location of the selection.

16. A system for document processing and data extraction using coordinate selection data over a network, the system comprising:
non-transitory memory; and
at least one computer processor accessing the non-transitory memory and executing instructions to perform steps including:
receiving a first document, the first document containing data for extraction;
receiving a selection of a first portion of the document;
recognizing a type of data contained in the selection, wherein the type of data includes at least one type of text and at least one type of image;
processing the first portion to extract a first layer of data and a second layer of data, wherein the first layer of data includes a plurality of text entries, and the second layer of data includes an image;
generating, based on the step of processing, a plurality of coordinate sets for the plurality of text entries;
extracting, based on the plurality of coordinate sets, the plurality of text entries from the first layer;
extracting the image from the second layer, wherein each of the one or more layers is extracted separately based on the at least one user preference;
determining, based on the plurality of coordinate sets and type of text of the plurality of text entries, that at least a portion of the plurality of text entries are associated with a structured data set;
automatically generating a structured data set including at least a portion of the plurality of text entries extracted from the document, the at least a portion of the plurality of text entries being structured in the structured data set based on coordinates of the at least a portion of the plurality of text entries;
storing the structured data set in a file; and
automatically generating an extraction rule based on the generated plurality of coordinate sets and the structured data set, the extraction rule executable by the at least one processor to extract text entries of the at least one type of text from a second document received after the first document;
receiving the second document from a computer system;
automatically matching the second document based on the step of automatically generating the extraction rule; and
extracting, based on the step of matching, data from the second document by executing the generated extraction rule, including based at least on a portion of the generated plurality of coordinate sets.

17. The system of claim 16, wherein the first document is converted into a preferred document format.

18. The system of claim 16, wherein an optical character recognition process is performed on at least a portion of the first document.

19. The method of claim 1, further comprising determining, based on the generated extraction rule, that at least a portion of text entries of the second document is associated with the structured data set.

20. The system of claim 14, wherein the at least one computer processor executes instructions to determine, based on the generated extraction rule that at least a portion of text entries of the second document is associated with the structured data set.

* * * * *